Figures 1, 3:
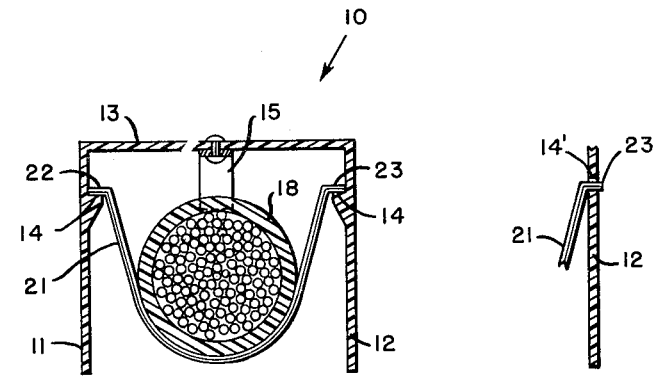

Aug. 31, 1965         W. K. KOLSTER         3,204,231
TEMPERATURE RESPONSIVE INDICATOR FOR CABLES AND THE LIKE
Filed Aug. 9, 1962

INVENTOR.
WILHELM K. KOLSTER
BY
Robertson & Smythe
ATTORNEYS.

United States Patent Office 3,204,231
Patented Aug. 31, 1965

3,204,231
TEMPERATURE RESPONSIVE INDICATOR FOR CABLES AND THE LIKE
Wilhelm K. Kolster, Michigan City, Ind., assignor, by mesne assignments, to The Swiss Colony, Inc., Monroe, Wis., a corporation of Wisconsin
Filed Aug. 9, 1962, Ser. No. 215,847
3 Claims. (Cl. 340—253)

The present invention relates to indicators and particularly to a temperature responsive indicator for cables and the like. Cables and the like shall mean elevated power transmission cables, conductors such as fluid and chemical conductors, and the like.

As an example, in the transmission of electrical power in elevated cables over long distances, severe power losses often occur at points along the cable where spliced joints are located. Usually it is easy to ascertain that a power loss exists in a given cable, but it is quite difficult to determine the exact location of the point or area of the loss or defect causing the loss. Additionally, it is desirable to be able visually to monitor overhead power lines or cables in troughs to detect defects at splices or joints.

The principal object of this invention is to provide a signal device that is easy to read at substantial distances and which may be attached to the cable, the signal device being responsive to elevated temperatures at an area along the cable at which the device is applied.

Another object of the invention is to provide such a signal which can be detected by a plane flying along the cable path or by a person walking along a cable trough.

Still another object of the invention is to provide such a signal in which no secondary effect will be generated in it by virtue of the current passing through the cable supporting the indicator in the event it is applied to a current carrying cable.

In one aspect of the invention, an extruded plastic, channel-shaped member of substantial length may have internal ledges formed on its opposed walls. The spacing of the walls may be such as to permit the member to fit over and cover a substantial area of a cable or a conductor. Alternatively, holes or slots may be provided in the walls of the channel-shaped member in place of the ledges.

In another aspect of the invention, spring means may be fixed to the interior surface of the wall of the channel member that connects the spaced walls thereof, and it is adapted to be compressed when the channel member is forced over the cable or conductor.

In still another aspect of the invention, a bimetallic, U-shaped clip may partially surround and contact the cable at its joint or at an area where increased temperature may occur, and its free ends may be hook-shaped so as to engage the ledges within the channel member on the inner surfaces of the opposed walls thereof, or alternatively, so as to pass through the holes or slots therein. The construction is such that when assembled to a cable at a joint or area of likely heating, the bimetallic, U-shaped clip holds the channel member on the cable with the spring under compression.

In still another aspect of the invention, the non-metallic, channel-shaped member may be provided with a vivid contrasting color which may be a coating or may be molded in the plastic during fabrication of the extrusion.

In still another aspect of the invention, a chain, cord or hinge may connect one end of the channel member to the cable.

When a joint in the cable becomes defective, causing power losses to develop, the joint heats up causing the bimetallic clip to become disengaged from its supporting ledge or slot means, whereupon the spring dislodges the channel member from the cable joint and it hangs swingingly suspended from the cable by the chain, cord or hinge, and is easily detected from substantial distances so that inspectors in a plane or car traveling along the path of the cable will readily detect defective cable joints and repair them.

The above as well as other objects and novel features of the invention will become apparent from the following specification and accompanying drawing which is merely exemplary.

Figure 2:
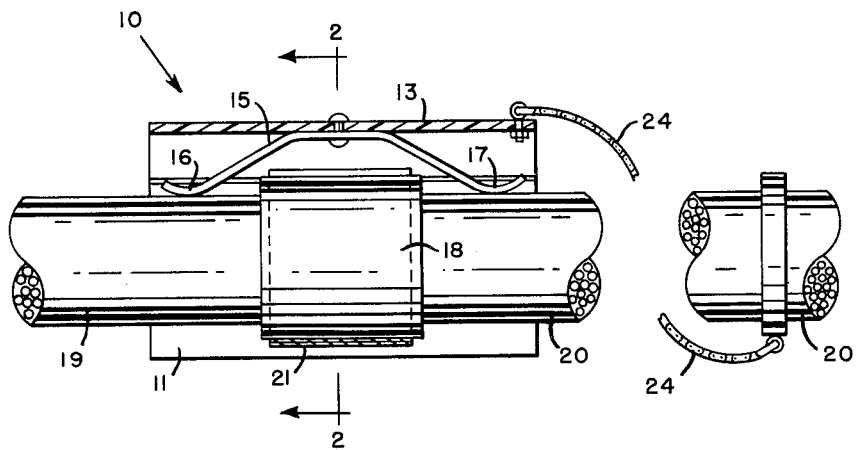

In the drawing:
FIG. 1 is a sectional elevational view of an indicator embodying the principles of the invention;
FIG. 2 is a sectional elevational view taken substantially along line 2—2 of FIG. 1; and
FIG. 3 is a modified form of the invention.

Referring to the drawing, the principles of the invention are shown as applied to an indicator including a channel-shaped member 10 which preferably is non-metallic and may be extruded from a plastic such as polyethylene or the like. Preferably, the member 10 is provided with a vivid contrasting color which may be a coating painted on, or a permanent colored plastic. The member 10 may include spaced legs 11, 12 joined at their one ends by a wall 13. The inwardly facing surfaces of walls 11, 12 may include restraining means such as ledge or protuberance means 14 at the same elevation near, but spaced from the wall 13. Alternatively, the ledge or protuberance means may be dispensed with, and holes or slots 14' may be formed in the side walls 11, 12 at the location of the ledge means 14 (FIG. 3).

A leaf spring 15 or the like may be fixed by a rivet or similar fastener to the inner surface of wall 13 and it may include curved leaf spring portions 16 and 17. The channel-shaped member 10 is adapted to be placed over the sleeve 18 covering a spliced or other type of joint or area between two sections 19 and 20 of a power transmission cable or other conductor. The member 10 is arranged so that its open side faces downwardly and when in proper position, compresses spring 15.

In order to releasably hold the member 10 in place with spring 15 compressed, a U-shaped clip 21 may surround the lower half of the joint sleeve 18 or area of a conductor. The free ends of the legs of clip 21 may have outwardly formed flanges 22, 23 adapted to rest on ledge means 14, or alternatively to extend into the holes or slots 14'. The U-shaped clip 21 preferably has a relatively great axial length so as to cover a substantial area of the cable or conductor, and preferably is of a bimetallic construction. The construction and arrangement of the parts are such that the application of heat to the clip 21 by the joint it surrounds causes the legs of the clip 21 to move toward each other until the flanges 22, 23 no longer coact with ledge means 14 or alternatively with the holes or slots 14', whereupon spring 15 forces the channel member off the joint so that it falls free of the joint it covered. A chain or cord 24 may have one end connected to the member 10 and its other end connected to the cable 19, 20. Accordingly, when sufficient heat is developed at a joint to cause the channel member 10 to become dislodged from the cable joint, it will hang from the cable by the chain or cord 24 and will be readily visible from substantial distances, particularly since it is of a vivid contrasting color, so that inspectors flying or riding along the path of the cable will detect defective joints requiring repair.

Although the member 10 could be of metal, such would produce an undesirable secondary effect because of the completed secondary circuit through the bimetallic member and the portion of the member 10 between the ends of the bimetallic member. Such is particularly undesirable because of its heating effect on the bimetallic means and consequent possible false release of the device.

Although the various features of the improved thermal detector for defective cable joints have been shown and described in detail to fully disclose one embodiment of the invention, it will be evident that changes may be made in such details and certain features may be used without others without departing from the principles of the invention.

What is claimed is:

1. In a thermal indicator for power transmission cables and the like, a non-metallic member adapted to cover, and to lie in close proximity to a joint between two sections of a cable that are spliced together; resilient means connected to said member and acting against said cable to force said member off said cable; means for loosely connecting said member to said cable; and thermal responsive clip means having a substantial area in contact with the joint between said two spliced sections, and including flange means adapted to cooperate with restraining means on said member for holding said clip means in contact with said cable and such that when said joint reaches a predetermined temperature, said clip means releases said member and said resilient means dislodges said member from said cable, said member then being suspended from said cable by said means for loosely connecting said member thereto.

2. In a thermal indicator for power transmission cables and the like, a plastic member adapted to cover, and to lie in close proximity to a joint between two sections of a cable that are spliced together; resilient means connected to said member and acting against said cable to force said member off said cable; thermal responsive clip means having a substantial area in contact with the joint between said two spliced sections, and including flange means adapted to cooperate with restraining means on said member for holding said clip means in contact with said cable and such that when said joint reaches a predetermined temperature, said clip means releases said member and said resilient means dislodges said member from said cable; and cord means connecting said plastic member to said cable, whereby when said member is dislodged from said cable, it hangs suspended from said cord.

3. In a thermal indicator for cables, an indicating member adapted to cover, and to lie in close proximity to a localized heatable area of a cable, a cover being of an electrically non-conducting material and having clip engaging means thereon; means for urging said cover away from its location relative to said cable; means for loosely connecting said member to said cable; and bimetallic clip means in contact with said heatable area and having ends engaging said clip engaging means of said cover when in relatively cool condition, said clip means holding said cover in position on said cable, said bimetallic clip means releasing said cover when said heatable area reaches a predetermined temperature and permitting the cover to move away from said cable, said member then being suspended from said cable by said means for loosely connecting said member thereto, said non-conducting cover electrically insulating the ends of said clip means relative to each other.

References Cited by the Examiner

UNITED STATES PATENTS

| 2,170,070 | 8/39 | Deleray | 200—138 XR |
| 2,248,017 | 7/41 | Cohen | 200—138 |

NEIL C. READ, *Primary Examiner.*